US006931423B2

(12) United States Patent
Sexton et al.

(10) Patent No.: US 6,931,423 B2
(45) Date of Patent: Aug. 16, 2005

(54) WRITE-BARRIER MAINTENANCE IN A GARBAGE COLLECTOR

(75) Inventors: Harlan Sexton, Palo Alto, CA (US); David Unietis, San Francisco, CA (US); Peter Benson, Boulder, UT (US)

(73) Assignee: Oracle International Corp., Redwood Shores, CA (US)

( * ) Notice: Subject to any disclaimer, the term of this patent is extended or adjusted under 35 U.S.C. 154(b) by 210 days.

(21) Appl. No.: 10/339,707

(22) Filed: Jan. 9, 2003

(65) Prior Publication Data

US 2003/0105772 A1 Jun. 5, 2003

Related U.S. Application Data

(60) Continuation-in-part of application No. 10/102,844, filed on Mar. 22, 2002, now Pat. No. 6,678,697, which is a division of application No. 09/248,295, filed on Feb. 11, 1999, now Pat. No. 6,457,019.
(60) Provisional application No. 60/378,391, filed on May 8, 2002.

(51) Int. Cl.[7] .............................................. G06F 17/00
(52) U.S. Cl. ........................ 707/205; 707/102; 707/206
(58) Field of Search ................................ 707/200–206, 707/100–104.1

(56) References Cited

PUBLICATIONS

Hardware-based solution detecting illegal references in real-time Java Higuera-Toledano, M.T.; Real-Time Systems, 2003. Proceedings, 15th Euromicro Conference on , Jul. 2–4, 2003.*

Do generational schemes improve the garbage collection efficiency?Srisa–an, W.; Chang, J.M.; Chia–Tien Dan Lo; Performance Analysis of Systems and Software, 2000. ISPASS. 2000 IEEE International Symposium on , Apr. 24–25, 2000.*

Dynamic detection of access errors and illegal references in RTSJ Higuera–Toledano, T.M.; de Miguel–Cabello, M.A.; Real–Time and Embedded Technology and Applications Symposium, 2002. Proceedings. Eighth IEEE Sep. 24–27, 2002.*

* cited by examiner

*Primary Examiner*—David Jung
(74) *Attorney, Agent, or Firm*—Ditthavong & Carlson, P.C.

(57) ABSTRACT

An approach is provided for maintaining a write barrier during an assignment operation between a source object and a target object. A source tag is obtained from a first reference to the source object, and a target tag is obtained from a second reference to the target object. The source tag and the target tag are compared, such that if the source tag is in a predetermined relationship with the target tag, then a data structure (e.g., a remember table or exit table) associated with the write barrier is updated in accordance with the assignment operation. In one embodiment, the routine to update the data structure is dispatched from a function table based on a tag value in a header associated with the source object.

12 Claims, 4 Drawing Sheets

WRITE-BARRIER MAINTENANCE IN A GARBAGE COLLECTOR

RELATED APPLICATIONS

The present application claims the benefit of U.S. Provisional Patent Application Ser. No. 60/378,391 filed on May 8, 2002, the contents of which are hereby incorporated by reference.

The present application is a continuation-in-part of U.S. patent application Ser. No. 10/102,844 filed on Mar. 22, 2002 now U.S. Pat. No. 6,678,697, which is a divisional application of U.S. patent application Ser. No. 09/248,295 filed on Feb. 11, 1999 now U.S. Pat. No. 6,457,019, the contents of both of which are hereby incorporated by reference.

FIELD OF THE INVENTION

The present invention relates to computer systems and more particularly to managing memory for a runtime execution environment.

BACKGROUND OF THE INVENTION

Objects are entities that encapsulate data and, in some environments, operations and methods associated with the object. When an object is created, a certain amount of memory is allocated for the object, and when the object is no longer needed, the memory for the object should be deallocated so that it can be reused for other purposes. In dynamic run-time environments, objects are allocated and deallocated throughout the life of program, and memory management for such dynamic objects is crucial to the correctness and performance of dynamic run-time environments.

Many dynamic run-time environments create objects that last as long as the objects are being referenced by a program, and these objects are deallocated when they are no longer referenced through a procedure known as garbage collection. There are many different kinds of garbage collectors, and experience has shown that segregating objects based on their lifetimes allows the garbage collector to employ different allocation and deallocation strategies for each set of objects.

For example, objects can be segregated into categories of newer objects (i.e. those that have been recently allocated) and older objects (i.e. those that have been less recently allocated). When an object is initially allocated, it is allocated in a memory area reserved for newer objects ("newspace"), and after a certain amount of time, the object is moved. or "tenured" into another area for older objects called "oldspace." Because newspace tends to hold many objects that are frequently allocated and abandoned, memory allocation within this area is preferably implemented by a very fast technique such as "frontier consing" (i.e. incrementing a pointer to the beginning of free storage) and garbage collection by a copying garbage collector. On the other hand, since oldspace tends to hold fewer and longer-lived objects, it may be more desirable to perform memory allocation using a buddy or best fit allocation technique, and deallocation by a mark-sweep garbage collector.

The performance of such generational garbage collector depends on the efficiency of calculating a root set for all the objects in the newer memory area. A root set for newspace is a set of objects such that the transitive closure of objects in the set (i.e. the set of objects reachable from the object in the root set) contains all the live objects in newspace. One method of simplifying the root set calculation is to maintain a "remember table," which is a data structure used by the garbage collector to record which objects in newspace are referenced by an object in oldspace. Accordingly, the remember table is updated when an assignment operation places a reference to a newspace object in an oldspace object. The check that occurs to determine whether the assignment operation places a reference to the newspace object in the oldspace object is referred to as a "write barrier." It is desirable to detect and process such assignments in an efficient manner.

In run-time environments that permit multiple users to connect in separate, concurrent sessions to a server system, such as a relational database system, garbage collection poses an additional challenge. When designing a run-time environment for such a multi-user environment, scalability in terms of the number of simultaneous users who can establish separate sessions is very important. User scalability is primarily constrained by the size of the memory footprint that each session consumes. For example, a server system may have 100 Mb of memory for supporting all the user sessions. If the session memory footprint is 1 Mb, then only 100 users can be supported at one time. Therefore, it is desirable to reduce the session memory footprint to improve scalability.

One approach for reducing the session memory footprint is to provide a shorter duration memory named "call memory" that is active for the duration of a "call" but automatically deallocated when the call terminates. A call is the period of time when the user is actively using the server, such as a transaction in a database server. Accordingly, those objects that do not need to live beyond the duration of the call are placed in the call memory rather than session memory. When the call is completed, objects in the call memory are deallocated and the call-duration memory is reclaimed for us. This approach has been implemented in Oracle Corporation's PL/SQL™ language, for instance, in which objects are explicitly declared as having the duration of a call or of a session. Memory management in such a language is straightforward because the objects are simply allocated in the memory that corresponds to their duration.

The JAVA™ programming language, however, defines, the lifetime of many objects, especially system objects, to extend throughout the duration of a session and does not have the notion of a call or call memory. Accordingly, one approach is to simply ignore the provision of the call memory by the multi-user system and allocate every object in session memory, but this approach suffers from scalability because short-lived objects are unnecessarily allocated in session memory.

Another approach, however, is to allocate objects first in the shorter-duration call memory, and then, at the time the call terminates, migrate the live objects into the longer duration session memory. Dead objects, i.e. those objects that are no longer needed, are not migrated but are freed when the call memory is deallocated. In this other approach, session memory is only increased for the call memory objects that are still alive at the end of the call. One way in which call memory objects can be alive is if a live object in session memory directly or indirectly refers to the call memory object.

Additionally, it is also important to keep track of those references within session memory that refer to locations in call memory. An exit table provides a convenient mechanism for identifying which objects in call memory are still alive because they are directly or indirectly referenced by session memory objects. Accordingly, the exit table is updated when an assignment operation places a reference to a call memory object in a object living session memory, and the check that occurs to determine this happens is also referred to herein as a write barrier. Thus, it is desirable to detect and process such assignments and update the exit table efficiently.

Objects can be exhibit many different lifetimes, and these lifetimes need not be comparable. Accordingly, maintenance of remember tables (or exit tables) grows in complexity, in that management of the variety of lifetimes is unwieldy. Consequently, garbage collection becomes inefficient under such circumstances. It is noted that various objects may require different out-of-line handling. That is, depending on the data structure that is utilized to record which objects in newspace are referenced by an object in oldspace, multiple out-of-line routines can be employed to execute update of the corresponding data structure. Performance, thus, is governed by how quickly the corresponding routine is dispatched.

Therefore, a need exists for distinguishing relative object lifetimes at assignment time to improve efficiency of garbage collection. There is also a need for rapidly invoking the proper routine to update a data structure such as an exit table or a remember table in support of garbage collection.

SUMMARY OF THE INVENTION

These and other needs are addressed by the present invention by encoding information about the storage of objects in tags that are embedded in pointers to the objects and in headers belonging to the objects. Pointer tags encode information about the objects referenced by the pointers in the pointers themselves, and header tags can encode additional information about the object in a tag belonging to a header of the object, which is an area of memory associated with the object and usually contiguous to the beginning of the object. By comparing the pointer and header tags, the appropriate action to maintain data structures can be efficiently determined, and the tag values can be used to dispatch an appropriate routine.

For example, pointer tags can be utilized to distinguish relative object lifetimes without having to examine the object headers to determine immediately whether to update a memory management data structure at a write barrier. Furthermore, the values of the header bits can be employed as an index into a table of functions to permit rapid identification of and dispatching to appropriate out-of-line routines and to streamline the cases that the identified routines handle. Further, by using a variety of object header bits, and coordinating the pointer tag values with values of the object header bits, expedient identification of those objects that do not require expensive out-of-line handling can be performed.

In one implementation, a source tag is extracted from a reference to the source object, and a target tag is extracted from a reference to the target object. The source tag and the target tag are compared. If the source tag is less than the target tag, then a header tag is fetched from a header associated with the target object based on the reference to the target object. The object tag and the target tag are compared to determine whether the source tag is in a predetermined relationship (e.g., less than) with the target tag. If the object tag is less than the target tag, then dispatching to a routine is performed to update a data structure (e.g., a remember table or an exit table) associated with the write barrier based on the object tag. This approach advantageously provides efficient management of memory and improved performance of garbage collection.

Accordingly, one aspect pertains to a method for maintaining a write barrier during an assignment operation between a source object and a target object. A source tag is obtained from a first reference to the source object, and a target tag is obtained from a second reference to the target object. Additionally, the source tag and the target tag are compared, and a data structure associated with the write barrier is updated in accordance with the assignment operation, if the source tag is in a predetermined relationship with the target tag.

Another aspect pertains to a method for maintaining a write barrier during an assignment operation between a source object and a target object. A source tag is obtained from a first reference to the source object, and a target tag is obtained from a second reference to the target object. The source tag and the target tag are compared to determine whether the source object belongs to a memory space that contains objects of a more recent lifetime than objects contained in a memory space to which the target object belongs. Further, a data structure associated with the write barrier is updated in accordance with the assignment operation, if the source object belongs to a memory space.

Another aspect relates to a method for maintaining a write barrier during an assignment operation between a source object and a target object. A reference tag is obtained from a first reference to the source object, and an object tag is obtained by dereferencing a second reference to the target object. Additionally, the reference tag and the object tag are compared. A data structure associated with the write barrier is updated in accordance with the assignment operation, if the reference tag is in a predetermined relationship with the object tag.

Yet another aspect pertains to a method for maintaining a write barrier during an assignment operation between a source object and a target object. A source tag is obtained from a reference to the source object, and a target tag is obtained from a reference to the target object. The source tag and the target tag are compared. If the source tag is less than the target tag, then the following steps are performed: fetching an object tag from a header associated with the target object based on the reference to the target object; comparing the object tag and the target tag to determine whether the source tag is in a predetermined relationship with the target tag; and if the object tag is less than the target tag, then dispatching to a routine to update a data structure associated with the write barrier based on the object tag.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

Figure 2:
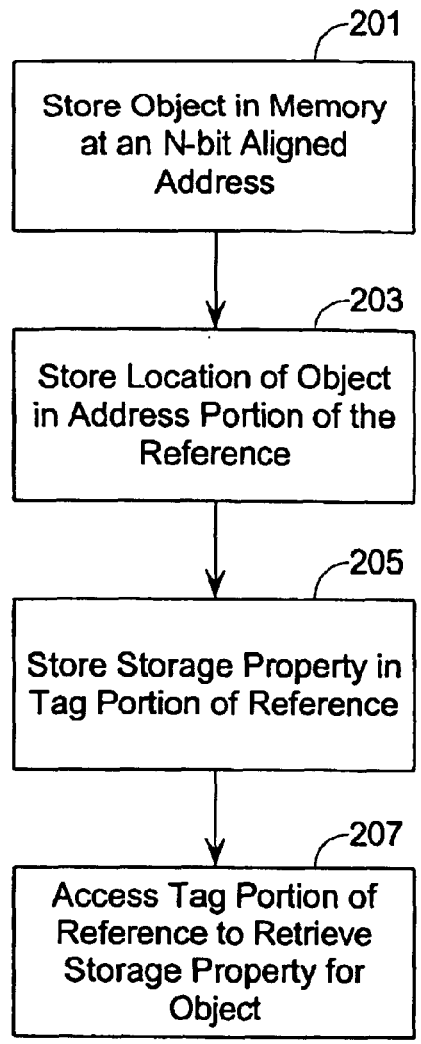
Figure 3:
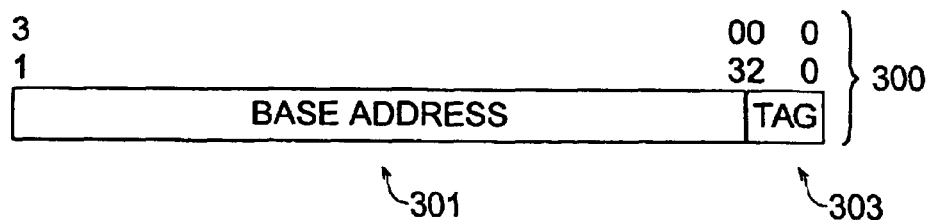
Figure 4:
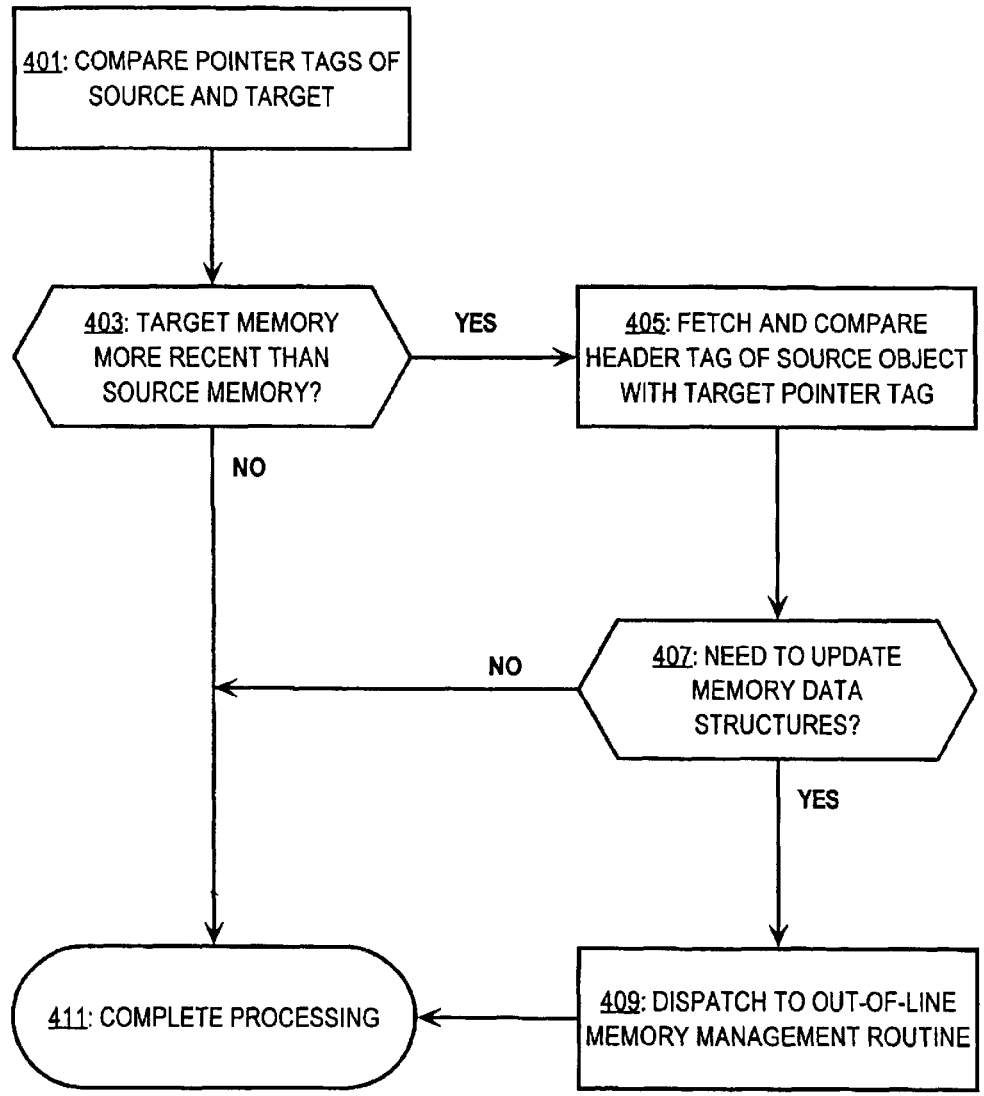
Figure 5:
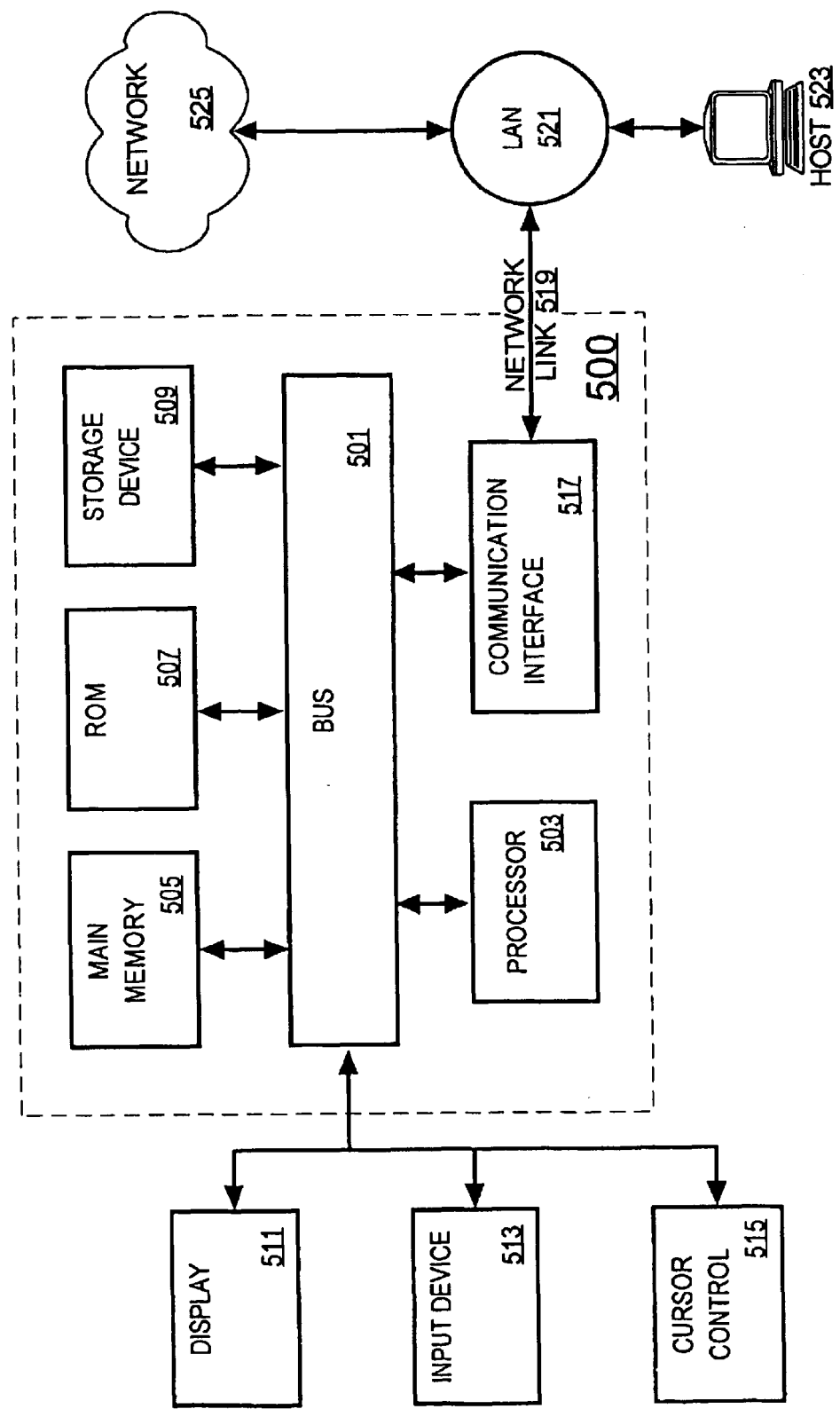

FIG. 2 is a flowchart describing steps for creating and using a tagged pointer;

FIG. 3 is a diagram of an exemplary implementation of a tagged pointer;

FIG. 4 is a flowchart showing maintenance of a write barrier during assignment operation between a source object and a target object, according to an embodiment of the present invention; and FIG. 5 depicts a computer system that can be used to implement an embodiment of the present invention.

DESCRIPTION OF THE PREFERRED EMBODIMENT

A system, method, and software for maintaining a write barrier during an assignment operation between a source object and a target object are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Memory Model

One embodiment of the present invention is illustrated with respect to a memory model that is implemented for a multi-user run-time environment. Accordingly, a detailed description of the memory model for this working example is provided, but the present invention is not limited to this example nor to the use of this memory model.

Figure 1:
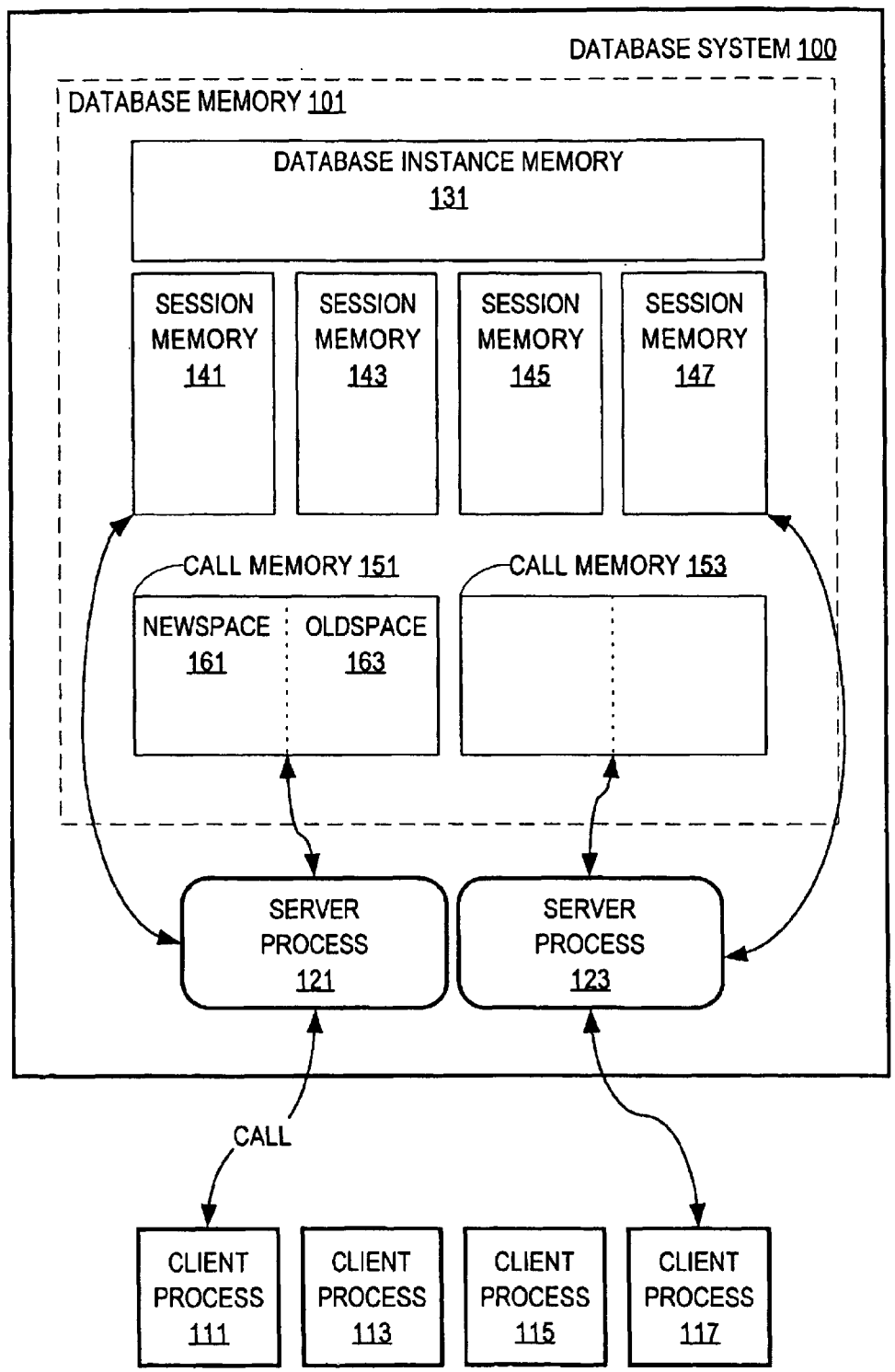
FIG. 1 is a diagram of a database system supporting a run-time environment for a language such as the JAVA™ programming language, according to one embodiment of the present invention.

FIG. 1 schematically illustrates a multi-user database system 100 with which a run-time environment for a language such as the JAVA™ programming language may be used, although the present invention is not limited to multi-user database systems in particular and may be applied to other multi-user systems. In the illustrated configuration, client processes 111, 113, 115, and 117 establish database sessions with the database system 100. A database session refers to the establishment of a connection between a client and a database system through which a series a calls may be made. As long as the client remains connected in the database session, the client and the associated database session are referred to as being active. Active clients can submit calls to the database system 100 to request the database system 100 to perform tasks. One example of a call is a query in accordance with the Structured Query Language (SQL), and another example is a method invocation of a JAVA™ programming language object or class, defined for performing a database task for database system 100.

Database system 100 comprises, among other components, a database memory 101 for storing information useful for processing calls and a number of server processes 121 and 123 for handling individual calls. The database memory 101 includes various memory areas used to store data used by server processes 121 and 123. These memory areas include a database instance memory 131, session memories 141, 143, 145, and 147, and call memories 151 and 153. It is to be understood that the number of the session memories and call memories in FIG. 1 is merely illustrative and, in fact, the number of such memories will vary over time as various clients make various calls to the database system 100.

The database instance memory 131 is a shared memory area for storing data that is shared concurrently by more than one process. For example, shared memory area may be used store the read-only data and instructions (e.g., bytecodes of JAVA™ programming language classes) that are executed by the server processes 121 and 123. The database instance memory 131 is typically allocated and initialized at boot time of the database system 100, before clients connect to the database system 100.

When a database session is created, an area of the database memory 101 is allocated to store information for the database session. As illustrated in FIG. 1, session memories 141, 143, 145, and 147 have been allocated for clients 111, 113, 115, and 117, respectively, for each of which a separate database session has been created. Session memories 141, 143, 145, and 147 are a shared memory used to store static data, i.e., data associated with a user that is preserved for the duration of a series of calls, especially between calls issued by a client during a single database session. JAVA™ programming language static class variables are one example of such static data.

A call memory, such as call memory 151, is used to store data that is bounded by the lifetime of a call. When client 111 submits a call to the database system 200, one of server processes 121 or 123 is assigned to process the call. For the duration of the call, the server process is allocated a call memory for storing data and other information for use in processing the call. For example, server process 121 uses call memory 151 and session memory 141 for processing a call submitted by client process 111.

At any given time, a server process (e.g., processes 121, 123) is assigned to process a call submitted by a single client (e.g., clients 111, 113, 115, 117). After the server process completes its processing of a call from one client, the server process is free to be assigned to respond to the call of another client. Thus, over a period of time, a server process may be assigned to process calls from multiple clients, and a client may use multiple server processes to handles its various calls. The number of calls requiring execution by a server process is typically much fewer than the current number of active clients. Thus, database system 200 is typically configured to execute fewer server processes than the maximum number of active clients.

For garbage collection purposes, call memory, such as call memory 151, is further divided into a newspace 161 and an oldspace 163. Within generational garbage collector, objects are allocated in the newspace 161; and some of the objects within this newspace 161 are subsequently migrated into oldspace 163 based on their lifetime. A data structure such as a remember table is maintained at a write barrier; this write barrier maintenance is more fully described below with respect to FIG. 4.

According to one embodiment of the present invention, references to objects that are stored in call memory are implemented as pointers, as described with respect to FIG. 2.

Pointer Tags

It is recognized that an alignment invariant can be introduced and then exploited in a dynamic run-time environment for a strongly typed language such as the JAVA™ programming language to encode information about storage properties of the object within all references to the object. One example of a reference is a machine pointer, which contains a location of the object in the form of a real or virtual address in the memory space of the computer system. The information embedded within the pointer, which is likely to be sitting in a fast-access machine register, can therefore be retrieved very quickly, without requiring additional memory cycles to fetch the header of the referenced object.

Referring to FIG. 2, objects managed by the run-time environment are stored at an N-bit aligned address (step 200). In other words, the storage for these objects begins at virtual addresses that begin on $2^N$-byte boundaries. For example, the objects can be stored at three-bit aligned addresses, that is, on $2^3=8$ byte boundaries. Thus, a legal start address, expressed as an octal number, for such an object might be 02,447,630, but an address such as 02,447,634 is not a valid start address for the storage of an object. Consequently, the three least significant bits of the pointer do not serve to discriminate different objects, since only one of the eight values for the three least significant bits is a legal address and the remaining seven values do not point to any other object. Given this alignment restriction, machine pointers with addresses of 02,447,630 through 02,447,637 effectively refer to the same object.

Therefore, any of the N least significant bits of a pointer to an N-bit aligned object can be used to encode other information, namely storage properties, of the referenced object. The remaining portion of the pointer, called the "base address," contains the location of the object within the virtual memory. Consequently, any of the bits in a pointer that are less significant than the bits for the base address are available for indicating a storage property of the object. For example, all three bits of a pointer to a 3-bit aligned object can be used to indicate a storage property of the object. As another example, bits 2 and 3 can be dedicated to indicating a storage property of the object, but bit 0 can be used for some other kind of instance property.

In one implementation illustrated in FIG. 3, pointer 300 has a 32-bit virtual address. If objects within the run-time environment are aligned on 8-byte boundaries, then three least significant bits of pointer 300 are available for tag 304; and the remaining 29 bits, constituting base address portion 302, are used to hold the location of the referenced object. Although FIG. 3 depicts one example of a 32-bit pointer 300 with a 3-bit tag 304, the present invention is not limited to these particular sizes, and the pointer size and tag size may vary from implementation to implementation. For example, pointer tagging can be utilized for 16-bit, 36-bit, and 64-bit pointers, and 1-bit through 5-bit tags.

Referring back to FIG. 2, when a reference such as a pointer to an object is created, the location of the object is stored in the base address portion of the reference (step 202), and the desired storage property of the referenced object is stored in the tag portion (step 204). To retrieve the storage property for an object based on a pointer 300 referencing the object, the tag portion 304 of the pointer 300 is accessed (step 306) without dereferencing the pointer. The tag can be extracted in a variety of ways, for example, by masking the pointer to extract the least significant bits 304 or by calculating a pointer difference of the pointer 300 and the actual start address of the object.

To deference a tagged pointer, the base address is extracted from the pointer and then dereferenced. For example, a tagged pointer 02,447,634 is converted to the base address 02,447,630 for dereferencing. The base address can be extracted, for example, by masking off the tag. In the C programming language the tag can be masked off with the following expression: (ptr & ~07).

As previously mentioned, any of the N least significant bits of a pointer can be used to specify storage properties; such properties can indicate whether an object is stored in contiguous memory locations.

Storage Properties

A storage property is a stable instance property, other than "type", that generally pertains to how the object is stored in memory and how long the object is stored in memory managed by a run-time environment. It has been found to be particularly useful to encode within a pointer tag three kinds of storage properties: lifetime, format, and contiguity. In addition, combinations of these storage properties can be encoded in the pointer tag.

The lifetime storage property of an object indicates how long the object has been in existence. The lifetime can be expressed absolutely in terms of time or in relative terms to another object or to an event. For example, "recently" allocated objects can be tagged with a 0 and "older" objects can be tagged with a 1. More precisely in a generational garbage collector, the tag 0 is associated with objects in newspace, and the tag 1 is associated with objects in oldspace. In this case, an older object can be defined as surviving four occurrences in which newspace was scavenged for garbage collection. As another example, the lifetime can indicate whether the object was allocated during the current SQL call, in a previous call in the session, or has remained persistent between sessions.

The format of an object indicates what the internal representation of the object is. Format differs from type, in that type is a logical concept while format is a physical concept. Accordingly, it is possible for two objects of the same type to have different formats or internal representations. One example of a format for an object involves the internal representation of a reference to another object. This reference can be implemented in one format as a native machine pointer and as a numeric reference in another format. A numerical reference is an integer that describes the location of an object as a displacement or offset from an implicit base pointer, such as the space of an allocation area of memory or even the start of the object itself. Since the internal representation of a numerical reference is an integer, a numeric reference is more portable and potentially more relocatable than native machine pointers. In fact, numeric references themselves can be tagged to record storage properties, such as contiguity, of the objects the numeric references refer to.

Another storage property is the contiguity of the object, indicating whether the object is stored at contiguous memory locations or on noncontiguous pages. This storage property has been found to be particularly advantageous in run-time environments in which memory can only be obtained as a plurality of usually noncontiguous pages. A page is a fixed-length contiguous region of the (virtual) address space of a computer system. In one embodiment, the page size is 4096 ($2^{12}$), although the page size can range in other embodiments, such as from $2^8$ (256) to $2^{16}$ (65536) bytes. An object is said to be noncontiguous or "paged," if it is stored on a plurality of pages, especially if one of the pages is not contiguous to any other of the pages. Address calculation of a field, instance variable, or "slot" of a paged object is quite involved, by indexing though a page table, but much simpler for contiguous objects. Therefore, encoding the contiguity of an object in a reference tag enables the appropriate machine instructions to be dispatched for accessing the slots of the paged object.

The tag can also encode combinations of storage properties, such as the lifetime, contiguity, and format of the object. TABLE 1 lists one possible assignment of reference tag values for such properties:

TABLE 1

| TAG | REFERENCE TAG PROPERTY |
|---|---|
| 0 | Newspace lifetime (call memory area) |
| 1 | Oldspace lifetime (call memory area) |
| 2 | An external reference index encoded as a pointer |
| 3 | Unpaged object in session space |
| 4 | Unpaged object in other (non-session) space |
| 5 | Paged object in other space |
| 6 | Unpaged object in a process-specific memory space |
| 7 | Paged object in session space |

Since these storage properties of the object are encoded in all the references to the object, it follows that changes made to the storage property of the object is reflected in all the references to the objects. However, this restriction is not problematic for tagging storage properties. For example, some properties are essentially permanent, such as format or contiguity, and alteration of such pointer tags will rarely, if ever, occur. As another example, when a newspace object is tenured into oldspace by a generational scavenger, all references to that object must necessarily be relocated by the scavenger in any case, and, as part of this relocation, the tag can be updated, even though lifetime is not a permanent property of the object.

Additional properties of an object can be stored in a header, which is an area of memory associated with the object and is typically contiguous to the beginning of the object, for example, at a negative offset from the first fields or slot of the object. Alternatively, the object header can be positioned at the beginning of the object with the object-specific field laid out as normally but with a small, positive implied offset.

One of the fields in the object header holds bits for the header tag. These bits may be described as located at certain logical positions (e.g. bit 0, bit 1, bit 2, and bit 3), but these bits may be located at any physical bit position in a word in the object header. For example, logical bit positions 0–3 may correspond to physical bit positions 28–31. When the physical bit positions for the tab bits do not start at physical position 0, logical shift operations (e.g. logical shift right by 28) may need to be performed to align the tag values in a machine register. Some hardware platforms, however, employ bit-addressable memory, rendering the software shift operation unnecessary.

TABLE 2 lists one possible assignment of header tag values:

TABLE 2

| TAG BIT | OBJECT HEADER TAG PROPERTY |
|---|---|
| 0 | Whether recorded in a newspace 161 remember table |
| 1 | Whether object needs special-case handling (e.g. whether in a process specific area of memory and bit 3 is also set or whether the object is read-only and bit 4 is also set) |
| 2 | Whether recorded in a session memory 141 exit table |
| 3 | Whether the object is paged or in an other memory |

The object header tag bits are set or cleared in the corresponding position depending on whether the property indicated is present for the object. Thus, a maximum of $2^4=16$ different object tag values can be expressed, though for some of them are not necessarily valid for all objects. For example, an object where tag bit 0 is meaningful may reside in call memory, but an object for which tag bit 2 is meaningful may reside in session memory.

The remember table recordation bit (bit 0) indicates whether the object has been recorded in the remember table as part of the root set. This bit is set if the object has not been recorded in the remember table, and it is cleared when the object is being recorded in the remember table. Likewise, exit table recordation bit (bit 2) indicates whether the object has been recorded in the exit table, this bit is set if the object has not been recorded in the exit table and cleared when the object is being recorded in the exit table. Bits 1 and 3 are used to govern cases in which other data structures associated with memory management need be updated. For example, if an object is paged, a page map may need to be updated.

In contrast with some Smalltalk™ and LISP Machine™ implementations that encode type information in a pointer tag, one embodiment of the present invention employs referencing tagging in a dynamic run-time environment for a strongly typed language such as the JAVA™ programming language to encode non-type information about storage properties of an object. In a run-time environment for a strongly typed language, storing type information in a pointer is unnecessary because the compiler is already aware of the relevant type information generally in those contexts, e.g., message dispatching, in which knowing the type of an object is critical.

Write Barrier Maintenance

FIG. 4 is a flowchart showing maintenance of a write barrier during assignment operation between a source object and a target object, according to one embodiment of the present invention. Within a generational garbage collector, objects are allocated in a fresh memory area (e.g., newspace 161 or call memory 151) and some of the objects are migrated into a mature memory area (e.g., oldspace 163 or session memory 141, respectively) based on the objects' lifetime. A data structure, such as a remember table or an exit table, is maintained at a write barrier. That is, in processing an assignment of a target pointer to a target object into a field in source object referenced by source pointer, the data structure is conditionally updated to record information if the memory reference is from a mature memory to a fresh memory. More specifically, the data structure is to be updated if it is determined that the target object is in newspace or call memory and the source object is in oldspace or session memory, respectively.

Initially, pointer tags are obtained from respective references to a source object and a target object (i.e., a source tag and a target tag). The target tag is extracted from the target pointer, as by masking or computing a pointer difference, and the source tag is extracted from the source pointer. These operations are typically register-to-register operations for most computer architectures and do not involve dereferencing a memory pointer. Consequently, much of the overhead typically associated with dereferencing a memory pointer is avoided, such as issuing a memory read cycle on a system bus or performing a memory fetch. Therefore, pointer tags serve to avoid the expense of conventional approaches, which may incur during a cache miss or a virtual memory page fault. In particular, using only register operations results in a significant performance improvement over the conventional object header approach.

In step 401, the pointer tags of the source object and the target object are compared to determine whether the target memory is more recent than the source memory. This can be performed by a predetermined relational operation such as greater than (>). Depending on the values of the tag bits, the can be greater-than, greater-than-or-equal-to, less-than, or less-than-or-equal-to. For example, with the pointer values in TABLE 1, determining both whether the source object is in oldspace and the target object is in newspace and whether the source object is in session (or longer) memory and the target object is in call memory can be accomplished with a single relational operation, e.g. greater-than (>). That is, all the tag values for call memory objects are less than the tags values for objects in longer memories such as session memory; furthermore, the tag value for newspace (0) is less than the tag value for oldspace (1).

If the source object belongs to a memory that is at least as mature as the memory that the target object belongs to (controlled by step 403), then there may be no additional work to be performed at the write barrier and so execution branches to step 411, where processing of the assignment operation is completed, which may include addition in-line operations.

On the other hand, if the target object's memory is more recent than the source object's memory, additional work may need to be performed. For example, an exit table or a remember table may need to be updated. In this case, execution branches to step 405 where the source pointer is dereferenced to obtain a source header tag and compared with the target pointer tag to determine whether there is a need to update memory management data structures (controlled at step 407). If there is a need to update the data structure, then an out-of-line memory routine is dispatched (step 409), which may be performed by looking up the address of the routine in a function vector or jump table as indexed by the source header tag.

For example, a pointer to a newspace target object is first assigned to a oldspace source object. The first time this occurs (assuming no other assignments to the source object), the target pointer tag is 0, the source pointer tag is 1, and the source header tag is 1 (bit 0 being set of the source header tag). In this example, the source pointer tag is greater than the target pointer tag (i.e. 1>0), which cause the execution of step 405. The source header tag of 1 is also greater than the target pointer tag of 0 (i.e. 1>0), so the code for updating the remember table is invoked, which clears the source header tag bit 0. This invocation can be accomplished via a function vector that has a function pointer to a remember table maintenance routine stored at position 1 (i.e. the source header tag value). Accordingly, the value of the source header tag is used to look up, fetch, and call a pointer to the memory management routine.

The next time a pointer to a newspace target object is assigned to the oldspace source object, the target pointer tag is 0 and the source pointer tag is 1, but the source header tag is 0 because it had been earlier cleared by the remember table maintenance routine. In this, the remember table maintenance routine is not invoked because the relation 0>0 is false.

Finally, step 411 is performed where processing of the assignment operation is completed, which may include addition in-line operations.

Pointer Tag and Header Bits Assignment Matrix

Some of the advantages attained by embodiment of the present invention depend on an assignment of values to the pointer and header. One process for assigning these tag values is now described, assuming without loss of generality that N properties exist. For the purposes of explanation, eight properties are considered (i.e., N is 8), and thus, if the number of properties exceed eight, some of the properties can be coalesced into at most eight collections. These eight collections are denoted as the "Primary Properties." For example, if paged objects are supported, a requirement can be that a distinction between paged and unpaged instances needs to be determined. Under such a scenario, the set of paged objects can be represented as a union of one or more of the Primary Properties. These properties can be captured by an N×N matrix associated with the pointer tag and header bit assignments.

The N×N matrix can be constructed of 0's and 1's, where a "0" at the (i,j) entry represents writing of a "reference with property j" into a "container with property i" requiring no special handling; if special handling is needed, then a "1" is used at the (i,j) entry. In the example of eight collections, an 8×8 matrix is formed by coalescing a larger matrix as follows. If all of the (i,j) entries in the larger matrix are 0 for any i having Primary Property A and j having Primary Property B, then the (A, B) entry is "0," otherwise a "1" is used. In other words, if Primary Property A comprises the properties a, b, and c, and if Primary Property B comprises properties d and e, the (A, B) is 0 only if (a, d), (a, e), (b, d), (b, e), (c, d), and (c, e) are all 0. This matrix is referred to as a Primary Properties matrix.

A "concrete realization" of primary tags can be defined as an assignment of 0 . . . (N−1), e.g. 0-7, inclusive, of numbers to Primary Properties and a conditional expression on pairs of number (i,j). A "concrete matrix" can then be defined to possess "0" entries if the conditional expression is false for (i,j) or "1" entries otherwise. In an exemplary embodiment, restrictions can be imposed on the set of conditionals; e.g., masking one or more of the primary tags, and using only >, >=, <, and <=, or ==. In an alternative implementation, probabilities can be assigned to the (i,j) cases, in which a cost function for the total cost of the conditional (including the cost of obtaining a "false positive") can be formulated. A false positive occurs when a slow path is taken in cases that do not require it.

A realization is termed "Admissible" if there are no (i,j) that is "0" in the concrete matrix, and "1" in the Primary Properties matrix. A concrete realization is one such that the "fast case" for objects is not selected when the original rules specifies that a slow case should be used. This approach can be extended to permit use of header bits on the container (as well as the reference) object. According to one embodiment of the present invention, the header bits can represent both transient and permanent properties of the objects. That is, the header bit can be used to denote that the object is READ ONLY, such that an exception arises if an attempt is made to write into the object; another header bit can be used to denote that the object has not yet been placed in the newspace remember table, but is a candidate for such placement.

Hardware Overview

FIG. 5 illustrates a computer system 500 upon which an embodiment according to the present invention can be implemented. The computer system 500 includes a bus 501 or other communication mechanism for communicating information and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to one embodiment of the invention, write barrier maintenance (as described in FIG. 4) is provided by the computer system 500 in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the present invention. Thus, embodiments of the present invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and network 525 both use electrical, electromagnetic, or optical signals to convey information and instructions. The signals through the various networks and the signals on network link 519 and through communication interface 517, which communicate digital data with computer system 500, are exemplary forms of carrier waves bearing the information and instructions.

The computer system 500 can send messages and receive data, including program code, through the network(s), network link 519, and communication interface 517. In the Internet example, a server (not shown) might transmit requested code belonging an application program for implementing an embodiment of the present invention through the network 525, local network 521 and communication interface 517. The processor 503 may execute the transmitted code while being received and/or store the code in storage device 59, or other non-volatile storage for later execution. In this manner, computer system 500 may obtain application code in the form of a carrier wave.

The term "computer-readable medium" as used herein refers to any medium that participates in providing instructions to the processor 505 for execution. Such a medium may take many forms, including but not limited to non-volatile media, volatile media, and transmission media. Non-volatile media include, for example, optical or magnetic disks, such as storage device 509. Volatile media include dynamic memory, such as main memory 505. Transmission media include coaxial cables, copper wire and fiber optics, including the wires that comprise bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

CONCLUSION

Accordingly, the present invention provides an approach for maintaining a write barrier during an assignment operation between a source object and a target object. A source tag is obtained from a first reference to the source object. Also, a target tag is obtained from a second reference to the target object. The source tag and the target tag are compared to determine whether the source object belongs to a memory space that contains objects of a more recent lifetime than objects contained in a memory space to which the target object belongs. If the source object belongs to a memory space, a data structure associated with the write barrier is updated in accordance with the assignment operation.

While the present invention has been described in connection with a number of embodiments and implementations, the present invention is not so limited but covers various obvious modifications and equivalent arrangements, which fall within the purview of the appended claims.

What is claimed is:

1. A method for maintaining a write barrier during an assignment operation between a source object and a target object, comprising:
    obtaining a source tag from a first reference to the source object;
    obtaining a target tag from a second reference to the target object;
    comparing the source tag and the target tag; and
    if the source tag is in a predetermined relationship with the target tag, then updating a data structure used to implement the write barrier in accordance with the assignment operation.

2. A method of according to claim 1, wherein the predetermined relation is a numerical relation including one of greater-than, greater-than-or-equal-to, less-than, and less-than-or-equal-to.

3. A method according to claim 1, wherein the data structure includes a remember table or an exit table.

4. A computer-readable medium bearing instructions for maintaining a write barrier during an assignment operation between a source object and a target object, said instruction, being arranged, upon execution, to cause one or more processors to perform the method of claim 1.

5. A method for maintaining a write barrier during an assignment operation between a source object and a target object, comprising:
    obtaining a source tag from a first reference to the source object;
    obtaining a target tag from a second reference to the target object;
    comparing the source tag and the target tag to determine whether the source object belongs to a memory space that contains objects of a more recent lifetime than objects contained in a memory space to which the target object belongs; and
    if the source object belongs to a memory space, then updating a data structure used to implement the write barrier in accordance with the assignment operation.

6. A computer-readable medium bearing instructions for maintaining a write barrier during an assignment operation between a source object and a target object, said instruction, being arranged, upon execution, to cause one or more processors to perform the method of claim 5.

7. A method for maintaining a write barrier during an assignment operation between a source object and a target object, comprising:
    obtaining a reference tag from a first reference to the source object;
    obtaining an object tag by dereferencing a second reference to the target object;
    comparing the reference tag and the object tag; and
    if the reference tag is in a predetermined relationship with the object tag, then updating a data structure used to implement the write barrier in accordance with the assignment operation.

8. A method according to claim 7, further comprising:
    selecting the data structure from a plurality of data structures associated with respective memory spaces based on the object tag.

9. A method according to claim 8, wherein said selecting includes:
    dispatching to a routine from among a plurality of routines, each for updating a corresponding one of the data structures.

10. A computer-readable medium bearing instructions for maintaining a write barrier during an assignment operation between a source object and a target object, said instruction, being arranged, upon execution, to cause one or more processors to perform the method of claim 7.

11. A method for maintaining a write barrier during an assignment operation between a source object and a target object, comprising:
    obtaining a source tag from a reference to the source object;
    obtaining a target tag from a reference to the target object;
    comparing the source tag and the target tag; and
    if the source tag is less than the target tag, then performing the steps of:
        fetching an object tag from a header associated with the target object based on the reference to the target object;
        comparing the object tag and the target tag to determine whether the source tag is in a predetermined relationship with the target tag; and
        if the object tag is less than the target tag, then dispatching to a routine to update a data structure associated with the write barrier based on the object tag.

12. A computer-readable medium bearing instructions for maintaining a write barrier during an assignment operation between a source object and a target object, said instruction, being arranged, upon execution, to cause one or more processors to perform the method of claim 11.

* * * * *